United States Patent
Birkbeck et al.

(10) Patent No.: US 10,754,511 B2
(45) Date of Patent: Aug. 25, 2020

(54) MULTI-VIEW AUDIO AND VIDEO INTERACTIVE PLAYBACK

(71) Applicant: Google Inc., Mountain View, CA (US)

(72) Inventors: Neil Birkbeck, Sunnyvale, CA (US); Isasi Inguva, Mountain View, CA (US); Damien Kelly, Sunnyvale, CA (US); Andrew Crawford, Mountain View, CA (US); Hugh Denman, San Francisco, CA (US); Perry Tobin, Santa Cruz, CA (US); Steve Benting, San Mateo, CA (US); Anil Kokaram, Sunnyvale, CA (US); Jeremy Doig, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 1236 days.

(21) Appl. No.: 14/323,807

(22) Filed: Jul. 3, 2014

(65) Prior Publication Data
US 2015/0143239 A1 May 21, 2015

Related U.S. Application Data

(60) Provisional application No. 61/906,588, filed on Nov. 20, 2013.

(51) Int. Cl.
*G06F 3/0484* (2013.01)
*G11B 27/34* (2006.01)
(Continued)

(52) U.S. Cl.
CPC ............ *G06F 3/0484* (2013.01); *G11B 27/10* (2013.01); *G11B 27/34* (2013.01);
(Continued)

(58) Field of Classification Search
CPC .. G06F 17/30017; G06F 17/24; G06F 3/0484; H04N 21/4307; H04N 21/2368;
(Continued)

(56) References Cited

U.S. PATENT DOCUMENTS 6,788,333 B1    9/2004 Uyttendaele et al.
2006/0224940 A1* 10/2006 Lee ..................... G11B 27/034
                                                    715/203

(Continued)

FOREIGN PATENT DOCUMENTS

CN    103297805 A    9/2013
JP    2008-206039 A    9/2008
(Continued)

OTHER PUBLICATIONS

International Searching Authority, "International Search Report and the Written Opinion of the International Search Authority, or the Declaration," for International Application No. PCT/US2014/066713, dated Feb. 16, 2015, 10 pages.

(Continued)

*Primary Examiner* — Thu V Huynh
(74) *Attorney, Agent, or Firm* — Lowenstein Sandler LLP

(57) ABSTRACT

An interactive multi-view module identifies a plurality of media items associated with a real-world event, each of the plurality of media items comprising a video portion and an audio portion. The interactive multi-view module synchronizes the audio portions of each of the plurality of media items according to a common reference timeline, determines a relative geographic position associated with each of the plurality of media items and presents the plurality of media items in an interactive multi-view player interface based at least on the synchronized audio portions and the relative geographic positions.

20 Claims, 8 Drawing Sheets

(51) Int. Cl.

| | |
|---|---|
| *H04N 21/45* | (2011.01) |
| *H04N 21/2387* | (2011.01) |
| *H04N 21/242* | (2011.01) |
| *H04N 21/845* | (2011.01) |
| *H04N 21/8549* | (2011.01) |
| *G11B 27/10* | (2006.01) |

(52) U.S. Cl.
CPC ....... *H04N 21/2387* (2013.01); *H04N 21/242* (2013.01); *H04N 21/45* (2013.01); *H04N 21/8455* (2013.01); *H04N 21/8456* (2013.01); *H04N 21/8549* (2013.01)

(58) Field of Classification Search
CPC ............. H04N 21/2387; H04N 21/242; H04N 21/8549; H04N 21/8456; H04N 21/8455; G11B 27/24; G11B 27/10
See application file for complete search history.

(56) References Cited

U.S. PATENT DOCUMENTS

| | | | |
|---|---|---|---|
| 2008/0219641 A1 | 9/2008 | Sandrew et al. | |
| 2008/0294663 A1* | 11/2008 | Heinley | G06F 3/0481 |
| 2009/0141130 A1 | 6/2009 | Ortiz | |
| 2010/0017815 A1* | 1/2010 | Mas Ivars | H04N 21/2662 725/14 |
| 2010/0178036 A1 | 7/2010 | Heinmiller et al. | |
| 2010/0242066 A1* | 9/2010 | Tseng | H04N 7/17327 725/38 |
| 2011/0276333 A1 | 11/2011 | Wang et al. | |
| 2012/0070129 A1* | 3/2012 | Lin | H04N 21/234327 386/278 |
| 2012/0198317 A1* | 8/2012 | Eppolito | G11B 27/034 715/202 |
| 2012/0210231 A1* | 8/2012 | Ubillos | G11B 27/034 715/723 |
| 2012/0263432 A1 | 10/2012 | Shore | |
| 2012/0271867 A1* | 10/2012 | Grossman | G06F 17/2288 707/821 |
| 2012/0275770 A1 | 11/2012 | Tsai | |
| 2013/0097632 A1 | 4/2013 | Shah | |
| 2013/0124462 A1 | 5/2013 | Bryan et al. | |
| 2013/0162905 A1* | 6/2013 | Matsumoto | H04N 5/06 348/521 |
| 2013/0188932 A1 | 7/2013 | Hartley | |
| 2013/0222369 A1 | 8/2013 | Huston et al. | |
| 2013/0259446 A1 | 10/2013 | Sathish | |
| 2014/0122485 A1* | 5/2014 | Shyamsundar | G06F 16/48 707/737 |
| 2014/0126881 A1 | 5/2014 | Yoneda et al. | |
| 2015/0101026 A1* | 4/2015 | Kraus | H04L 63/102 726/4 |
| 2015/0121436 A1* | 4/2015 | Rango | G11B 27/10 725/88 |

FOREIGN PATENT DOCUMENTS

| | | |
|---|---|---|
| JP | 2011-45018 A | 3/2011 |
| JP | 2013-175964 A | 9/2013 |
| WO | 2009/042858 | 4/2009 |
| WO | 2013161319 A1 | 10/2013 |

OTHER PUBLICATIONS

European Patent Application No. 14864875.1, Extended European Search Report dated Jun. 6, 2017, 8 pages.

Akihiko Torii, et al., "Recent Research Trends in Multi-View Three-Dimensional Reconstruction", IPSJ SIG Technical Report, Apr. 2011 (Workshops held in Feb. and Mar. 2011) [DVD-ROM], Information Processing Society of Japan, Apr. 15, 2011, pp. 1 to 22, ISSN:1884-0930.

Tsuhan Chen, et al., "Accurate self-calibration of two cameras by observations of a moving person on a ground plane", Proceedings of the IEEE Conference on Advanced Video and Signal Based Surveillance 2007 (AVSS 2007), 7 Sep. 2007, pp. 129-134, ISBN:978-1-4244-1695-0.

Jan Erik Solem, translated by Aizo Aikawa, "Computer Vision", First Edition, Mar. 21, 2013, O'Reilly Japan, Inc., pp. 81 to 86 and 103 to 111, ISBN:978-4-87311-607-5.

Ballan, L. et al., "Unstructured Video-Based Rendering: Interactive Exploration of Casually Captured Videos", ACM Transactions on Graphics (TOG)—Proceedings of ACM SIGGRAPH 2010, vol. 29, Issue 4, Jul. 2010, Article No. 87.

Ballan, L., "Unstructured Video-Based Rendering: Interactive Exploration of Casually Captured Videos" [Viewed on Internet on Mar. 20, 2018] <URL: https://www.youtube.com/watch?v=gqSLsPrA7RE>, Published on May 26, 2010.

Ballan, L., "Unstructured VBR: Navigation example" [Viewed on internet on Mar. 20, 2018] <URL: https://www.youtube.com/watch?v=OmTCxff-DSk>, Published on Oct. 9, 2010.

Tompkin, J. et al., "Videoscapes: Exploring Sparse, Unstructured Video Collections", ACM Transactions on Graphics (TOG)—Proceedings of ACM SIGGRAPH 2012, vol. 31, Issue 4, Jul. 2012, Article No. 68.

Tompkin, J. et al., "Supplementary Material for Videoscapes: Exploring Sparse, Unstructured Video Collections" [retrieved from Internet] <URL: http://vecg.cs.ucl.ac.uk/Projects/Videoscapes/videoscapes-supplemental-material-final.pdf>.

Hasler, N. et al., "Markerless motion capture with unsynchronized moving cameras", IEEE Conference on Computer Vision and Pattern Recognition, Jun. 20-25, 2009, Miami, FL, USA, pp. 224-231.

Kennedy, L. et al., "Less Talk, More Rock: Automated Organization of Community-Contributed Collections of Concert Videos", Proceedings of the 18th International Conference on World Wide Web (WWW), Apr. 20-24, 2009, pp. 311-320.

"Development of a content distribution switch with a cache function which effectively utilizes a bandwidth", NEC Technical Journal, vol. 55, No. 5, NEC Corporation, May 24, 2002, p. 14, ISSN:0285-4139.

Sukrit, S. et al., "Synchronization of User-Generated Videos through Trajectory Correspondence and a Refinement Procedure", Visual Media Production, ACM, New York, Nov. 6, 2013, pp. 1-10, ISBN: 978-1-4503-2589-9.

* cited by examiner

MULTI-VIEW AUDIO AND VIDEO INTERACTIVE PLAYBACK

RELATED APPLICATIONS

This application is related to and claims priority to U.S. Provisional Patent Application No. 61/906,588 filed Nov. 20, 2013, the entire contents of which are hereby incorporated herein.

TECHNICAL FIELD

This disclosure relates to the field of media viewing services and, in particular, to multi-view audio and video interactive playback.

BACKGROUND

On the Internet, content sharing platforms or other applications allow users to upload, view, and share digital content such as media items. Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume the media items (e.g., watch digital videos, listen to digital music).

With the popularity of video sharing and social web platforms, there is an ever increasing amount of user-generated video. For events with several attendants, such as sporting events or concerts, many videos get uploaded, covering different viewpoints and different moments of time. Current video sharing sites try to recommend and rank these videos in order to give a user all available videos for an event. However, all the video content is typically available in an unorganized list of search query results, and the precise time and viewpoint of the video relative to the event are lost. Thus, a user will tend to simply view a single video of the event, allowing them to see a small portal into the event that was visible from a single content creator.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an interactive multi-view module identifies a plurality of media items associated with a real-world event, each of the plurality of media items comprising a video portion and an audio portion. The interactive multi-view module synchronizes the audio portions of each of the plurality of media items according to a common reference timeline, determines a relative geographic position associated with each of the plurality of media items and presents the plurality of media items in an interactive multi-view player interface based at least on the synchronized audio portions and the relative geographic positions. In one implementation, the interactive multi-view module also generates a single edited media item associated with the real-world event, by combining the plurality of media items based on the synchronized audio portions.

In order to identify the plurality of media items associated with the real-world event, the interactive multi-view module determines media items having metadata that identifies the real-world event. To synchronize the audio portions of each of the plurality of media items, the interactive multi-view module determines a temporal offset for each of the plurality of media items that maximizes or otherwise increases the correlation between the frequency-based audio spectrogram of each audio portion, wherein the temporal offsets represent locations on the common reference timeline. Determining the relative geographic position associated with each of the plurality of media items includes the interactive multi-view module determining the relative positions of separate cameras used to capture each of the plurality of media items at a time of the real-world event based on a plurality of points visible in each of the plurality of media items.

In one implementation, in order to present the plurality of media items in the interactive multi-view player interface, the interactive multi-view module displays an icon representing each of the plurality of media items, wherein each icon is displayed in a location based on the corresponding relative geographic position. The interactive multi-view module receives a user selection of an icon representing a first media item of the plurality of media items and begins playback of the first media item. Subsequently, the interactive multi-view module receives, at a time during playback of the first media item corresponding to a first point on the common reference timeline, a user selection of an icon representing a second media item of the plurality of media items and begins playback of the second media item at a time in the second media item corresponding to the first point on the common reference timeline. In one implementation, the interactive multi-view module predicts a subsequent media item that will be selected by the user and buffers the subsequent media item prior to a user selection of the subsequent media item.

BRIEF DESCRIPTION OF THE DRAWINGS

The present disclosure is illustrated by way of example, and not by way of limitation, in the figures of the accompanying drawings.

DETAILED DESCRIPTION

Figure 1:
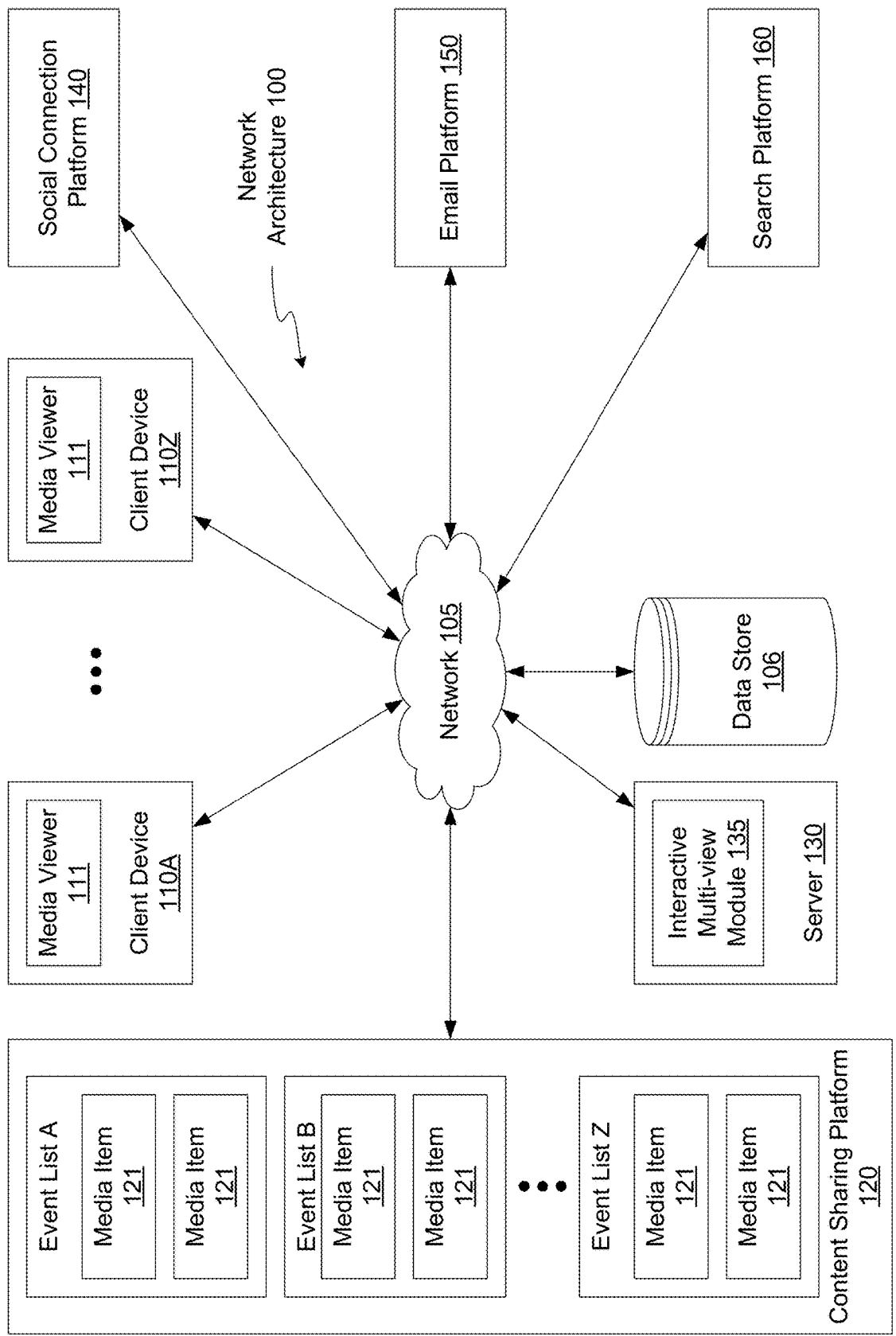
FIG. 1 is a block diagram illustrating an exemplary network architecture in which implementations of the present invention may be implemented.

Implementations are described for multi-view audio and video interactive playback. In one implementation, an interactive multi-view system organizes video data taken of the same real-world event into an interactive, easy to understand, and intuitive playback experience by recovering at least two pieces of information from the videos that are normally lost in the acquisition/upload process. This information may include, for example, the positions of the cameras when they captured the event and the synchronization of the videos according to a common reference timeline. After recovery of the position and time synchronization of the videos, the spatial information allows the system to create novel map-based navigation interfaces, linking videos with their real world 3D locations. The time synchronization enables seamless transition from different viewpoints of an event, rather than the typical playlist type of transition available from most sharing sites today. Linking the videos in space and time allows a user to seek along the event timeline beyond the duration of a single video and further may allow a user to interactively change viewpoint to get the feel from the event from a different location. A real-world event may be any event that occurs in the real-world (e.g., not on the Internet) that can be observed and captured (e.g., in photographs and on video).

In one implementation, the present interactive multi-view system overcomes limitations on bandwidth of Internet protocol transmission by utilizing cues based on user interaction, social feedback, and video quality to predict the next most likely video viewpoint to be selected by the user, thereby reducing bandwidth while ensuring a seamless video switch. Such a multi-view audio and video interactive playback experience has applications outside of concerts and sporting events. For example, in other implementations, crowd sourced videos can be used to improve surveillance, user generated content can be coupled to broadcast footage, or tutorials and trick tips for learning a new skill can be presented from multiple angles. The interface can also be coupled with a single edited summary video (e.g., a director's cut, or mash-up sourced from all the videos), or the multiple videos can be used to enhance the quality of individual videos in the set (e.g., improving the audio).

In one implementation, a complete system for organizing and presenting multi-view video content is disclosed. The playback offered by such a system may be referred to as free-viewpoint video. Existing systems for this task are restricted to laboratory capture rigs or multi-view studios, where the 3D pose of the camera and synchronization are easily controlled (e.g., wand-based methods for calibration). Broadcast recordings of such sporting events have the same benefit of being easily calibrated in advance, which has allowed such free-viewpoint and matrix-like effects to be used in broadcast footage of such events. Free-viewpoint also includes view synthesis, i.e. generating a new synthetic view using the existing physical camera views. Thus, in one implementation, if the user provided views are close enough, view synthesis can be a possible application on top of the described framework.

FIG. 1 is a block diagram illustrating an exemplary network architecture 100 in which implementations of the present disclosure may be implemented. In one implementation, the network architecture 100 includes client devices 110A through 110Z, a network 105, a data store 106, a content sharing platform 120, a server 130, a social connection platform 140, an email platform 150, and a search platform 160. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, etc. Each client device may include a media viewer 111. In one implementation, the media viewer 111 may be an application that allows users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books). The media viewer 111 may be provided to the client devices 110A through 110Z by the server 130 and/or content sharing platform 120. For example, the media viewer 111 may be an embedded media player that is embedded in a web page provided by the content sharing platform 120. In another example, the media viewer 111 may be an application that is downloaded from the server 130.

In one implementation, content sharing platform 120 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. The content sharing platform 120 may include multiple event lists (e.g., event lists A through Z). Each event list may include one or more media items 121. Examples of a media item 121 can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, and the like. A media item 121 may be consumed via the Internet and/or via a mobile device application. For brevity and simplicity, an online video (also hereinafter referred to as a video) is used as an example of a media item throughout this document. As used herein, "media," "media items," "online media items," "digital media," and "digital media items" can include an electronic file that can be executed or loaded using software, firmware or hardware configured to present the digital media item to an entity. In one implementation, the content sharing platform 120 may store the media items using the data store 106.

Social connection platform 140 may include one or more computing devices (e.g., servers), data stores, networks, software components, and/or hardware components that may be used to allow users to connect to, share information, and/or interact with each other. Social connection platform 140 may present to a user a listing (e.g., activity feed, feed, stream, wall, etc.) of objects (such as posts, content items (e.g., video, images, audio, etc.), status updates, favorability indications, tags, messages, and so on) generated by other users of a social network. Social connection platform 140 may also include a content sharing aspect that allows users to upload, view, tag, and share content, such as text content, video content, image content, audio content, and so on. Other users of social connection platform 140 may comment on the shared content, discover new content, locate updates, share content, and otherwise interact with the provided content. In one implementation, content sharing platform 120 may be integrated with social connection platform 140. For example, social connection platform 140 may use content sharing platform 120 to allow users to upload and/or share content. In another implementation, social connection platform 140 may be separate from content sharing platform 120. In one implementation, social connection platform 140 may also include chat functionality (e.g., a chat platform) to allow users to chat (e.g., to instant message) with each other.

In one implementation, email platform 150 may be one or more computing devices (e.g., servers), data stores, networks, software components, and/or hardware components that may be used to allow users to send and/or receive electronic-mail (emails) to each other. For example, a first user may use the email platform 150 to send an email to a second user regarding the time and location of a particular event. The first user may also attach files (e.g., video files, image files, text files, etc.) to the email. In one implementation, the email platform 150 may also include chat functionality (e.g., a chat platform) to allow users to chat (e.g., to instant message) with each other. In another implementation, the search platform 160 may be one or more computing devices, data stores, networks, software components, and/or hardware components that may be used to allow users to search for information and/or data. For example, the search platform 160 may allow a user to search the Internet and/or other networks for articles, blogs, websites, webpages, images, videos, and/or other content related to a particular topic (e.g., how to fix a car). The search platform 160 may also include a search engine.

In one implementation, server 130 may include one or more computing devices (e.g., a rack mount server, a server computer, etc. In one implementation, server 130 may be included in one or more of content sharing platform 120, social connection platform 140, email platform 150, and search platform 160. In another implementation, server 130 may be separate from content sharing platform 120, social connection platform 140, email platform 150, and search platform 160 but may communicate (e.g., exchange data) with content sharing platform 120, social connection platform 140, email platform 150, and search platform 160. In one implementation, server 130 includes interactive multi-view module 135. Interactive multi-view module 135 can identify videos or other media items associated with a given event and organize the videos in a manner to provide an interactive multi-view playback experience. In one implementation, interactive multi-view module 135 identifies videos associated with a given real-world event (e.g., videos that depict at least a portion of the occurrence of the event) and automatically synchronizes the videos according to a shared reference timeline. In addition, interactive multi-view module 135 may also determine the relative positions of the cameras used to capture each of the videos in order to display the videos in an interactive multi-view player interface. Interactive multi-view module 135 may generate a single representative "director's cut" video by combining at least a portion of the videos associated with the event for playback or may receive user input to control which videos are played in the interactive multi-view player interface. Additional details of interactive multi-view module 135 will be described below.

Figure 2:
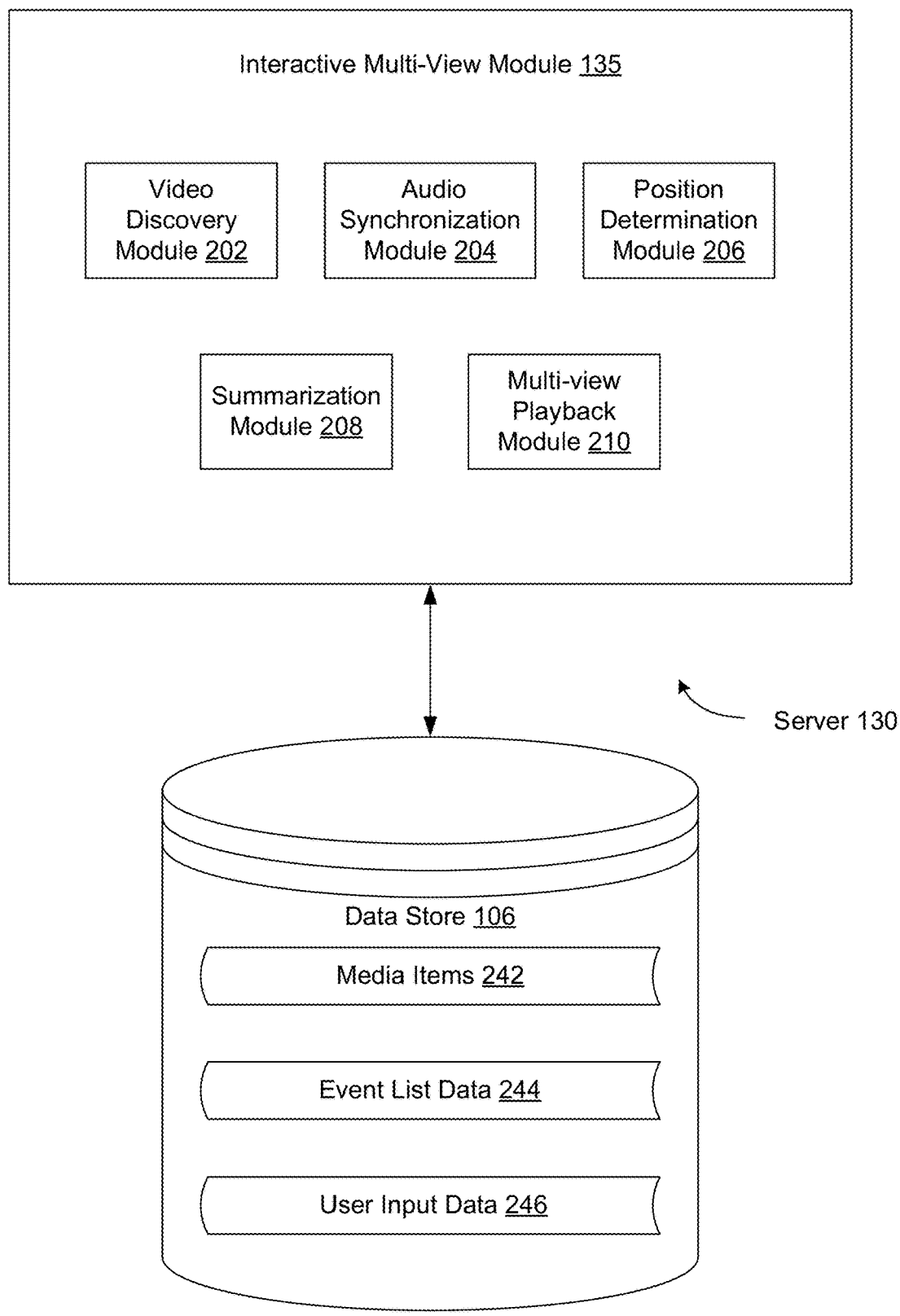
FIG. 2 is a block diagram illustrating an interactive multi-view module, according to some implementations.

FIG. 2 is a block diagram illustrating interactive multi-view module 135, according to an implementation. In one implementation, interactive multi-view module 135 includes video discovery module 202, audio synchronization module 204, position determination module 206, summarization module 208 and multi-view playback module 210. This arrangement of modules and components may be a logical separation, and in other implementations, these modules or other components can be combined together or separated in further components, according to a particular implementation. In one implementation, data store 106 is connected to interactive multi-view module 135 and includes media items 242, event list data 244 and user input data 246. In one implementation, server 130 may include both interactive multi-view module 135 and data store 106. In another implementation, data store 106 may be external to server 130 and may be connected to server 130 over a network or other connection. In other implementations, server 130 may include different and/or additional components which are not shown to simplify the description. Data store 106 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, video discovery module 202 identifies media items 242 associated with a real-world event, such as a concert, sporting event, or other event. In one implementation, video discovery module 202 scans media items 242 and identifies media items having metadata or other cues that identify the real-world event. The cues may include media cues obtained directly from the audio and/or video signals of the media items (e.g., common pieces of visual or audio information appearing in multiple videos) or metadata cues from metadata associated with the media items. The metadata cues may include information in the title or description of the video, user provided or system generated tags or categories, date and time information associated with the media items, geolocation information (e.g., GPS data) associated with the media items, or other information. Upon determining that a particular media item 242 is associated with a given real-world event, video discovery module may add the media item 242 to an event list 244 corresponding to the real-world event.

In one implementation, audio synchronization module 204 synchronizes the audio portions of each of the media items 242 in a given event list 244 according to a common reference timeline. In one implementation, audio synchronization module determines a temporal offset for each of the media items that increases or maximizes a correlation for a frequency based audio spectrogram of each audio portion. This temporal offset represents a location on the common reference timeline indicating the time at which each of the media items associated with the event begin relative to one another or relative to the occurrence of the real-world event. Since the media items may be user captured, the media items may capture different portions of the real-world event. Thus, the media items may begin and end at different times, and accordingly may have different associated temporal offsets. In one implementation, audio synchronization module 204 stores the temporal offsets in event list data 244.

In one implementation, position determination module 206 determines a relative geographic position associated with each of the media items 242 in the event list 244. In one implementation, position determination module 206 determines the relative positions of separate cameras used to capture each of the media items at the time of the occurrence of the real-world event. Position determination module 206 may use multiple points visible in the video portion of each of the media items in order to calculate the position of the camera used to capture each item, relative to other positions. In one implementation, position determination module 206 may plot these positions relative to one another and/or optionally using a geography of the location where the real-world event occurred (e.g., a stadium or arena). In one implementation, position determination module 206 stores the determined position information in event list data 244.

In one implementation, summarization module 208 generates a single edited media item associated with the real-world event. This edited media item may be referred to as a "director's cut" in some implementations. Summarization module 208 may combine multiple media items 242 together to form the director's cut. For example, the director's cut may include particular selections that are edited together to show a summary, overview or other form of presentation of the real-world event. The media items included in the director's cut may be manually selected by a content curator or summarization module 208 may automatically select the media items using popularity cues for each video, such as the number of views, comments, sharing activity, etc.

In one implementation, multi-view playback module 210 presents the media items 242 in an interactive multi-view player interface based at least on the synchronized audio portions and the relative geographic positions. In one implementation, multi-view playback module 210 displays an icon representing each of the media items at a location in the interactive multi-view player interface based on the corresponding relative geographic position determined by position determination module 206. Multi-view playback module 210 receives a user selection of an icon representing one of the media items and begins playback of the corresponding media item. Multi-view playback module 210 may store an indication of the user selection as user input data. During playback of the first media item, a user may select an icon representing a different media item. Multi-view playback module 210 may begin playback of the second media item at a time corresponding to the point on the common reference timeline of when the request was received. Thus, the second media item may begin playback at a point other than the beginning of the media file. As a result, from the viewer's perspective, the viewpoint changes, but the timing with respect to the real-world event does not change.

Figure 3:
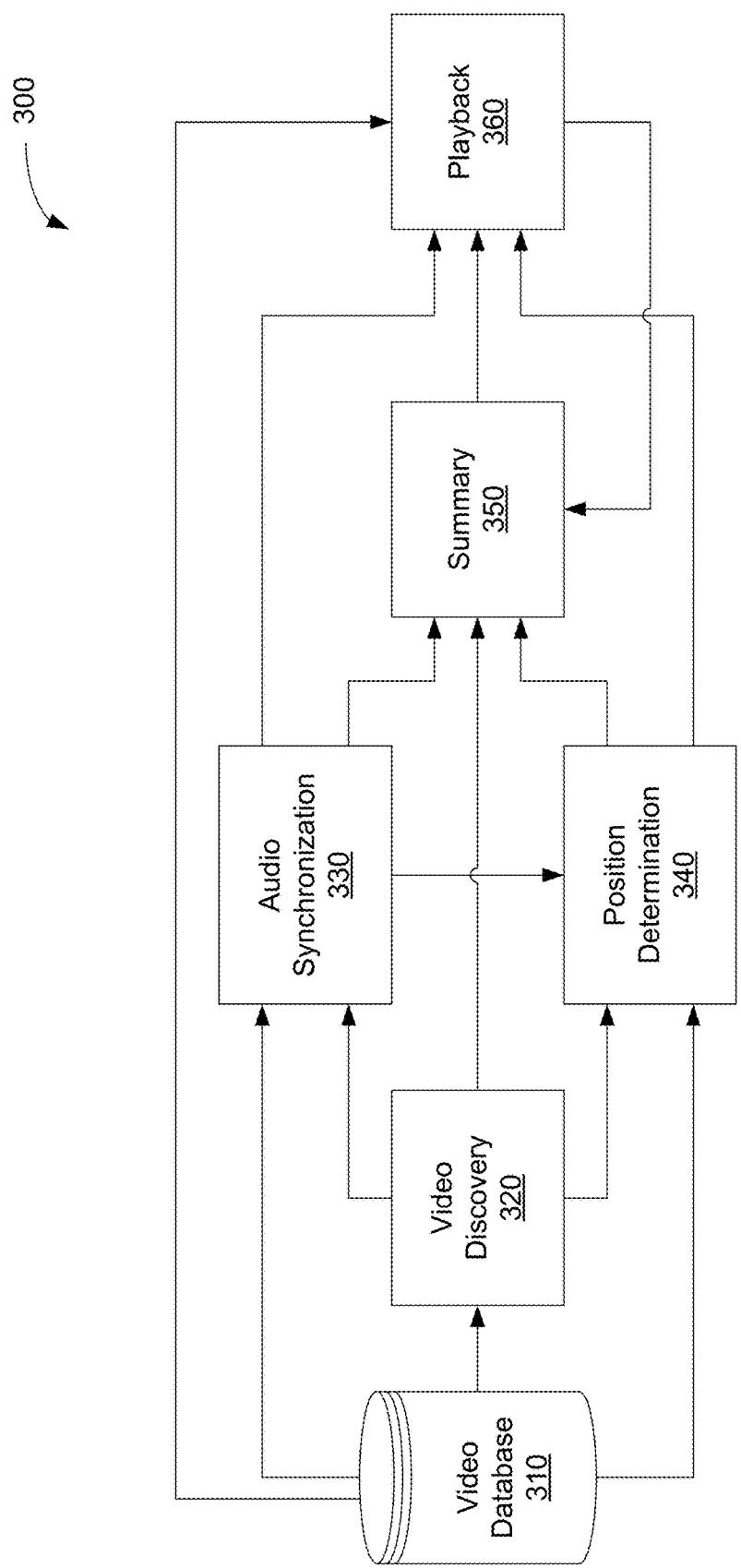
FIG. 3 is a block diagram illustrating an interactive multi-view processing flow, according to some implementations.

FIG. 3 is a block diagram illustrating an interactive multi-view processing flow, according to an implementation of the present disclosure. The various modules and components may be described in regards to their roles in identifying and synchronizing multiple videos of a given real-world event for interactive multi-view playback. In one implementation, the processing flow 300 begins with a video discovery stage 320 using videos or other media items from video database 310. The video discovery stage includes identifying videos associated with a given real-world event and may be performed by video discovery module 202. At block 330, audio synchronization is performed using the videos discovered during video discovery stage 320 and stored in video database 310. In one implementation, audio synchronization module 204 synchronizes the audio portions of each of the discovered videos according to a common reference timeline as described above. Audio synchronization 330 may use a belief propagation algorithm to synchronize the video clips in time using the audio signals. In one implementation, this takes into account all pairwise video relationships, allowing videos that are nearby to one another to have stronger influence on the final synchronization. At block 340, position determination is performed using the videos discovered during video discovery stage 320 and stored in video database 310. In one implementation, position determination module 206 determines a relative geographic position associated with each of the videos. Multi-view geometry factors in the camera positions (and optionally a 3D map) for map-based navigation and may be created manually or automatically. This information may be extracted from the videos using computer vision algorithms. Different viewpoints from the same camera position, caused by panning or camerashake, commonly found in videos of sporting and concert scenarios may be used to aid extraction of focal length. Based at least on the synchronized audio portions and the relative geographic positions, at summary stage 350, a single edited video associated with the real-world event may be created. In one implementation, summarization module 208 may create a "director's cut" video by combining multiple videos associated with the event that were discovered during video discovery 320. In summarization 350, multi-view geometry and signal quality metrics (such as shakiness or video quality) may be utilized to produce a single summarization video of the event. The playback stage 360 includes presenting the identified videos in an interactive multi-view player interface based at least on the synchronized audio portions and the relative geographic positions. In one implementation, multi-view playback module 210 presents the interactive multi-view player interface and receives user interaction to select which videos to be displayed. Playback and delivery 360 uses UI elements that present the user with a way to browse the video collection. This may include 3D navigation, allowing intuitive switching between views, and timeline event bars to denote key times in the video or regions during the event that have the most footage. In order to ensure smooth transitions when a user requests a new view, the system uses existing video infrastructure and tries to predict user transitions while keeping bandwidth usage to a minimum by only transferring content that will be actually displayed.

Figure 4:
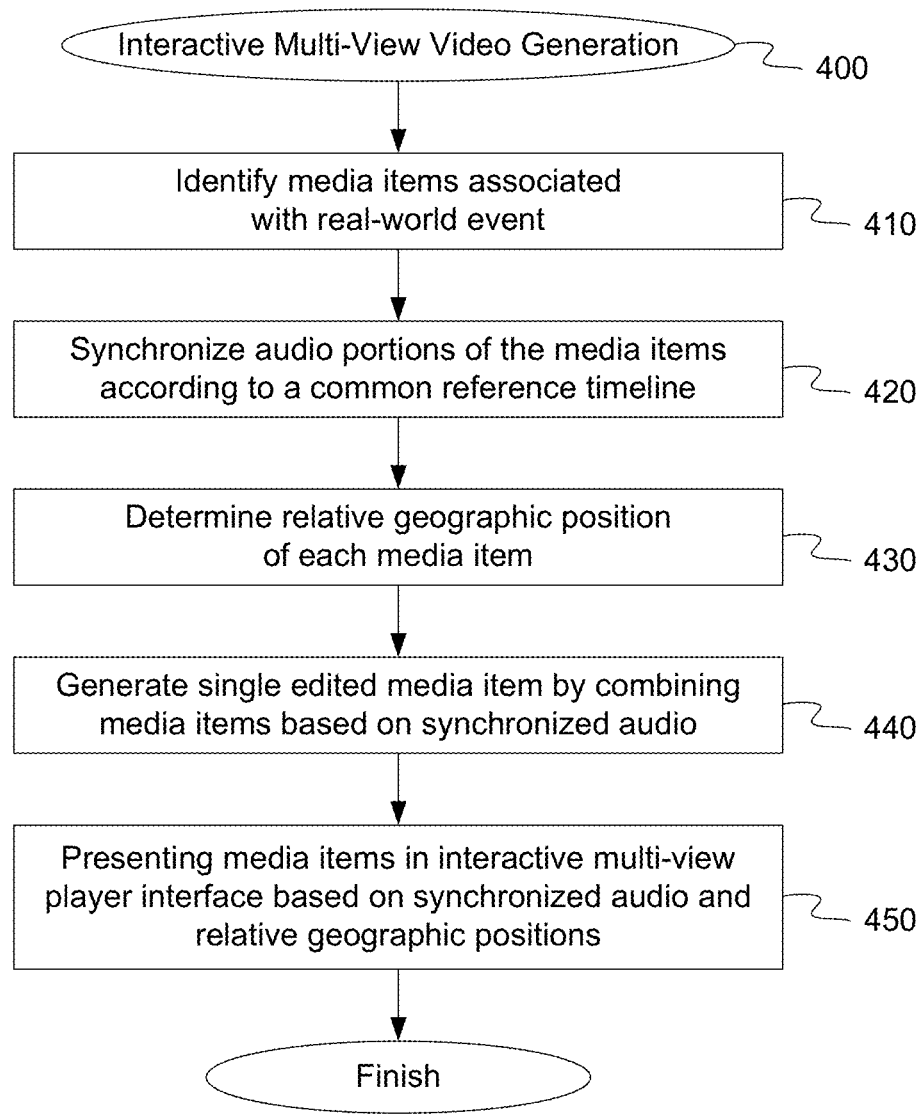
FIG. 4 is a flow diagram illustrating a method for interactive multi-view video generation, according to some implementations.

FIG. 4 is a flow diagram illustrating a method for interactive multi-view video generation, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can identify videos or other media items associated with a given real-world event and present an interface for interactive multi-view playback of the media items. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by interactive multi-view module 135 as shown in FIGS. 1 and 2.

Referring to FIG. 4, at block 410, method 400 identifies media items associated with a real-world event. In one implementation, video discovery module 202 identifies media items 242 associated with a real-world event, such as a concert, sporting event, or other event. In one implementation, video discovery module 202 scans media items 242 and identifies media items having metadata or other cues that identify the real-world event. Upon determining that a particular media item 242 is associated with a given real-world event, video discovery module may add the media item 242 to an event list 244 corresponding to the real-world event.

At block 420, method 400 synchronizes audio portions of the media items according to a common reference timeline. In one implementation, audio synchronization module 204 synchronizes the audio portions of each of the media items 242 in a given event list 244 according to a common reference timeline. In one implementation, audio synchronization module determines a temporal offset for each of the media items that increases or maximizes a correlation for a frequency based audio spectrogram of each audio portion. This temporal offset represents a location on the common reference timeline indicating the time at which each of the media items associated with the event begin relative to one another or relative to the occurrence of the real-world event.

At block 430, method 400 determines a relative geographic position associated with each media item. In one implementation, position determination module 206 determines a relative geographic position associated with each of the media items 242 in the event list 244. In one implementation, position determination module 206 determines the relative positions of separate cameras used to capture each of the media items at the time of the occurrence of the real-world event. Position determination module 206 may use multiple points visible in the video portion of each of the media items in order to calculate the position of the camera used to capture each item, relative to other positions.

At block 440, method 400 generates a single edited media item by combining media items based on the synchronized audio portions. In one implementation, summarization module 208 generates a single edited media item associated with the real-world event. Summarization module 208 may combine multiple media items 242 together to form the director's cut. For example, the director's cut may include particular selections that are edited together to show a summary, overview or other form of presentation of the real-world event. The media items included in the director's cut may be manually selected by a content curator or summarization module 208 may automatically select the media items using popularity cues for each video, such as the number of views, comments, sharing activity, etc.

At block 450, method 400 presents the media items in an interactive multi-view player interface based on the synchronized audio portions and the relative geographic positions. In one implementation, multi-view playback module 210 presents the media items 242 in an interactive multi-view player interface based at least on the synchronized audio portions and the relative geographic positions. In one implementation, multi-view playback module 210 displays an icon representing each of the media items at a location in the interactive multi-view player interface based on the corresponding relative geographic position determined by position determination module 206. Multi-view playback module 210 receives a user selection of an icon representing one of the media items and begins playback of the corresponding media item. Multi-view playback module 210 may store an indication of the user selection as user input data. During playback of the first media item, a user may select an icon representing a different media item. Multi-view playback module 210 may begin playback of the second media item at a time corresponding to the point on the common reference timeline of when the request was received. Thus, the second media item may begin playback at a point other than the beginning of the media file. As a result, from the viewer's perspective, the viewpoint changes, but the timing with respect to the real-world event does not change.

Figure 5B:
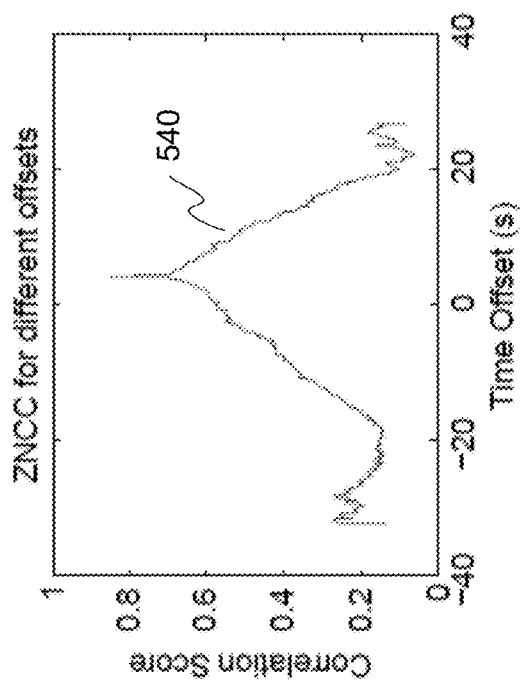
FIG. 5B is a diagram illustrating a line graph for the correlation score between the frequency spectrograms illustrated in FIG. 5A, according to an implementation.
Figure 5A:
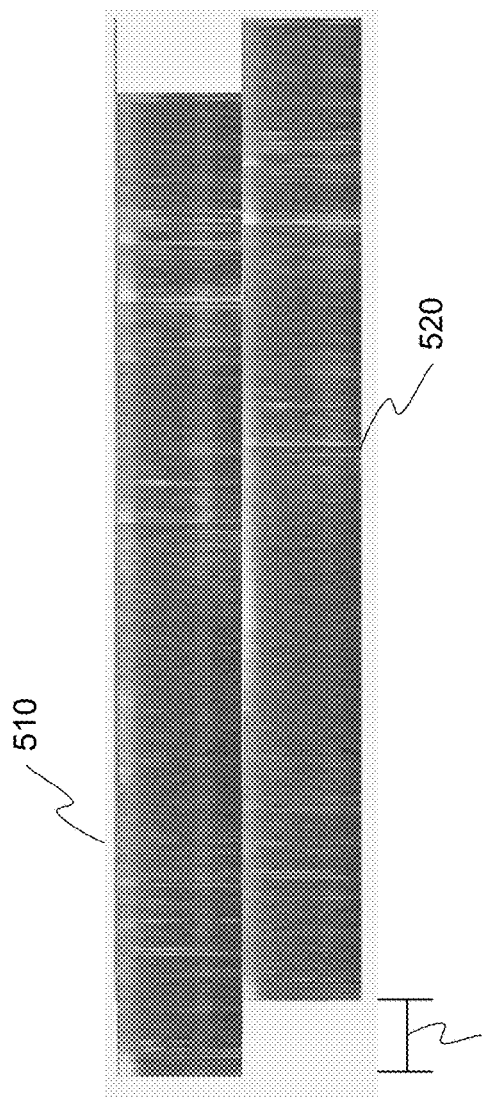
FIG. 5A is a diagram illustrating frequency spectrograms corresponding to two media items related to a common event, according to an implementation.

FIG. 5A is a diagram illustrating frequency spectrograms corresponding to two media items related to a common event. FIG. 5B is a diagram illustrating a line graph for the correlation score between the frequency spectrograms illustrated in FIG. 5A. After a set of videos has been identified as coming from the same real-world event, the videos may be synchronized to a common timeline. The details of this process are described below in the context of a multi-view playback interface.

For N videos, one objective is to find a consistent set of offsets, $x_{1:N} = (x_1, x_2, \ldots, x_N)$ that aligns the audio signals 510, 520. The system may first correlate each pair of signals to measure the relative offsets $x_{ij}$ 530. A consensus solution is then obtained by formulating a joint probability distribution using pairwise information and making an inference using belief propagation. Belief propagation allows for nearby pairs of signals which share more closely related audio signals to drive the consistency of the final solution.

The temporal offset 530 that bring two audio signals 510, 520 into alignment can be found by choosing features from the audio signals, and then comparing these features at potential audio offsets. Temporal offsets with the best matching scores 540 can be used for a hypothesis temporal alignment. There are several possibilities for the features of the audio signals to use, such as the raw audio signal, or spectral methods such as the MEL spectra or cepstrum commonly used in speech processing. In one implementation, the system uses a frequency-based feature, the audio spectrogram, $s_i(t,w):[0,T_i-1] \times \Omega \rightarrow R$, that measures the spectral power of wavelength $w \in \Omega$ at time t in input video i, where $T_i$ is the length of the input audio signal i. For matching, the system may use a zero-normalized cross correlation as a measurement of consistency of a pair of spectrograms as the normalization makes the comparison insensitive to overlap length. FIG. 5A illustrates two spectrograms 510, 520 that are currently misaligned due to an erroneous offset and FIG. 5B illustrates the zero-mean normalized cross correlation (ZNCC) of the two spectrograms indicating the correct alignment.

The normalized cross-correlation function, $f_{ij}(t):[1-T_j, T_i-1] \to [-1,1]$, is the correlation of the zero and length normalized spectrograms $s_i$, $s_j$, and is defined as $$f_{ij}(t) = \sum_{\tau \in T_{ij}(t)} \sum_{\omega} \frac{(s_i(\tau, \omega) - \bar{s_i}(\tau))(s_j(\tau-t, \omega) - \bar{s_j}(t))}{\hat{s}_i(t)\hat{s}_j(\tau-t)} \quad (1)$$

Where $T_{ij}(t)=[\max(0,t), \min(T_i-1,t+T_j-1)]$ is the region of overlap, and the mean and length of the signal are taken over the same region of overlap $$\bar{s}(t) = \frac{1}{|T_{ij}(t)||\Omega|} \sum_{\tau \in T_{ij}(t)} \sum_{\omega \in \Omega} s(\tau, \omega) \quad (2)$$

$$\hat{s}(t) = \sqrt{\sum_{\tau \in T_{ij}(t)} \sum_{\omega \in \Omega} (s(\tau, \omega) - \bar{s}(t))^2} \quad (3)$$

The most likely K-peaks are extracted by finding maxima of the signal.

The hypothesis extracted from the pairwise analysis are used to build pairwise evidence, $$\phi_{ij}(x) \propto \sum_{k=1}^{K} c_{ij}^k \exp\left(\frac{-(x - x_{ij}^k)^2}{2\sigma^2}\right) + u \quad (4)$$

with c being a confidence measure derived from the correlation $f_{ij}$.

The system then models the joint probability distribution of the temporal offsets by combining the pairwise evidence, $\phi_{ij}$, giving $$p(x_{1:N}) \propto \prod_{ij} \phi_{ij}(x_j - x_i). \quad (5)$$

As there is a one parameter ambiguity in the solution space (i.e., $p(x_{1:N})=p(x_{1:N}+t)$), the system fixes one node as a reference and set its value to $x1=0$, leading to the joint probability distribution of $$p(x_{2:N}) \propto \prod_{i>1,j>1} \phi_{ij}(x_j - x_i) \prod_{i>1} \phi_i(x_i), \quad (6)$$

which is a common form seen in Markov random field models.

The marginals of x in Equation (6) are then approximated through loopy belief propagation, which uses an iterative series of messages between nodes to propagate evidence through the graph. At iteration $t \geq 1$ of the algorithm, the message from node i to j is defined using messages from the previous iteration as $$m_{ij}^t(x_j) = \int \phi_{ij}(x_j - x_i)\phi_i(x_i) \underbrace{\prod_{k \in N(i) \setminus j} m_{ki}^{t-1}(x_i)}_{\text{Partial belief}} dx_i, \quad (7)$$

with messages at t=0 defined either uniformly or randomly.

The belief at iteration t approximates the marginal and is defined using the propagated messages, $$b_i^t(x_i) = \phi_i(x_i) \prod_{k \in N(i) \setminus j} m_{ki}^{t-1}(x_i). \quad (8)$$

Notice that Equation (7) is a convolution of the pairwise factor with the partial belief, which allows the system to compute message updates efficiently using the Fourier transform.

After T iterations, the final solution $X_i$, can be obtained my maximizing the belief:

$$x_i = \mathrm{argmax}_x b_i^T(x). \quad (9)$$

As loopy belief propagation is not guaranteed to converge to the correct marginals, the system may try all possible nodes as the reference to obtain N hypothesis solutions. The system keeps the final solution that maximizes a consistency score, $$F(x_{1:N}) = \sum_i \sum_{j \in N(i)} \phi_{ij}(x_j - x_i). \quad (10)$$

Alternatively, the correlation score can be used directly to measure the overall consistency of a hypothesis solution:

$$F(x_{1:N}) = \sum_i \sum_{j \in N(i)} f_{ij}(x_j - x_i). \quad (11)$$

The theory of multiple view geometry provides the mathematical tools to do reconstruction of camera poses and scene geometry from image-derived point correspondences. Although work has been done on 3D constructions from multiple camera views, many techniques only work with assumptions that the internal calibrations (e.g., focal lengths, principal points) for the cameras are known. However, with user generated content, the system cannot assume that the internal calibration information is known. Further, unlike methods for 3D vision-based reconstruction from unstructured photo-collections that rely on intrinsics encoded in the EXIF headers, video meta-data often does not contain this useful information. Thus, in one implementation, the system uses the pure camera rotation present in the user generated videos to automatically extract the internal calibration.

For concert or sporting events, the camera often stays in one position and only rotates slightly to observe the action. As this is one target use-case, the system uses a method to provide an accurate initial estimate of the camera focal lengths for this type of video motion. The system then filters out image regions which are better or doing camera pose-extraction and multiview-reconstruction using some selection algorithm, and then uses the already derived focal lengths to do pose extraction on these image regions.

In the case that the camera has only undergone rotation (and possibly negligible translation), the transformation relating image coordinates between the two images can be related by a 3×3 projective homography matrix H.

Without loss of generality, let the first camera be aligned with the origin; therefore, the camera matrix is defined as $$P_1 = K[I_{3 \times 3} | 0], \quad (12)$$

and if the second view is only a rotation, R of the first, then $$P_2 = K[R | 0], \quad (13)$$

Here the internal camera parameters are assumed to be zero-skew and the principle point is assumed to be at the center of the image plane for the camera, which is the case for most consumer cameras:

$$K = \begin{bmatrix} f_x & 0 & 0 \\ 0 & f_y & 0 \\ 0 & 0 & 1 \end{bmatrix}, \quad (14)$$

With fx and fy being the focal length in x and y respectively. The homography relating the images is then a function of the internals and the rotation matrix:

$$H = KRK^{-1}, \quad (15)$$

Since R is an orthogonal 3×3 rotation matrix satisfying $I_{3 \times 3} - RR^T$, using Equation (15), the constraint can be rewritten as $$D = (K^{-1}HK)(K^{-1}HK)T - I_{3 \times 3}, \quad (16)$$

which is a function of only K and the recovered homography H. Since H can be estimated directly from image matches, the constraint $Tr(DD^T) = 0$, gives a non-linear least-squares problem in the unknowns fx and fy. The system solves for fx and fy by minimizing $Tr(DD^T)$ in the space of fx and fy, starting from some initial value for (fx, fy) and then onwards iteratively computing ($\Delta fx$, $\Delta fy$) using trust region methods like Levenberg-Marquardt until it converges to an acceptable minimum.

The system can automatically discard parts of the image sequence with zoom or insufficient rotation of the camera by inspecting homography H, and select the remaining portions to estimate the camera internal parameters.

Image Selection, Pairwise Matching & Bundle Adjustment

For computational reasons, the system may first reduce the number of frames input to the reconstruction, by selecting only a few salient frames from each video sequence by considering the number of features, quality of each frame, and amount of temporal motion. Once the system has selected images for reconstruction, it can extract SIFT features from each image and match pairs of images using these features. In one embodiment, the system may use matching by Lowe threshold to get an initial set of matches. To prune incorrect matches, the system may further refine this matching by only selecting matches whose scale and orientation difference agree with most of that of other matches. This can be done by binning the initial set of matches into a 2D histogram of scale and orientation difference across the match. The system selects the matches in the bin containing the most number of matches as the final refined matches.

The system may then compute a two-view model, i.e., fundamental matrix and f-inliers, for each pair of images using the matches. The system may use the focal length information for the images computed above to compute these two-view models. Once we have the two-view models, the system can iteratively add two-view models together and do bundle adjustment, to get the final 3D model containing all the cameras.

For static 3D maps, the system takes the final 3D position of the camera to be the median position over all of the reconstructed positions for that video sequence. The reconstructed 3D point cloud can be used to derive a 3D model for the 3D map-based interface, or alternatively, the reconstructed 3D camera poses can be manually aligned to an artist created 3D map of the environment.

Input videos from consumer cameras often suffer from quality issues. Before utilizing the video streams, the system may optionally apply color-correction between the videos, reduce the shakiness through motion stabilization, and reduce noise artifacts through denoising. Audio levels between the clips may also be normalized to common levels.

The system can use energy minimization to identify when to switch videos. In addition to the common quality and transition cues, our energy terms can take into account the 3D positions and viewpoints of the cameras. Using the positions and viewpoints, a transition may be more continuous if switching in a consistent direction.

After solving for the optimization, a combined edited video may be created. Alternatively, the playback engine takes in a list of edit points, as sequence of pairs, indicating times where the video should be switched. In this way, the user may watch a director's cut, while the playback engine dynamically updates the viewpoint using the edit list. The user may also switch from the director's cut at any point to get a free-viewpoint effect.

The benefits of having 3D camera pose and sparse approximating scene geometry are threefold: 1) the spatial arrangement of the videos can be presented to the user allowing for intuitive interactive viewpoint selection, 2) in-between virtual viewpoints may also be presented to a user, and 3) spatial arrangement can be used to predict likely next views. The interactive multi-view player makes use of these advantages, while presenting other UI elements that indicate important points on the timeline. In-between virtual views will likely not have the fidelity as the input views, but are good to cover buffer and latencies inherent in video switching.

UI Elements

Figure 6B:
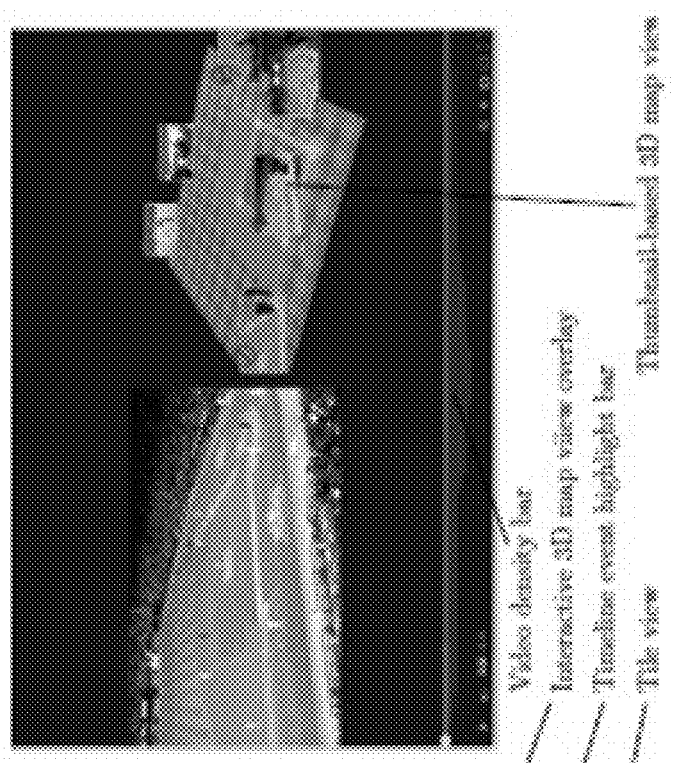
FIGS. 6A and 6B are diagrams illustrating examples of two possible presentations of the interactive multi-view video playback interface, according to some implementations.
Figure 6A:
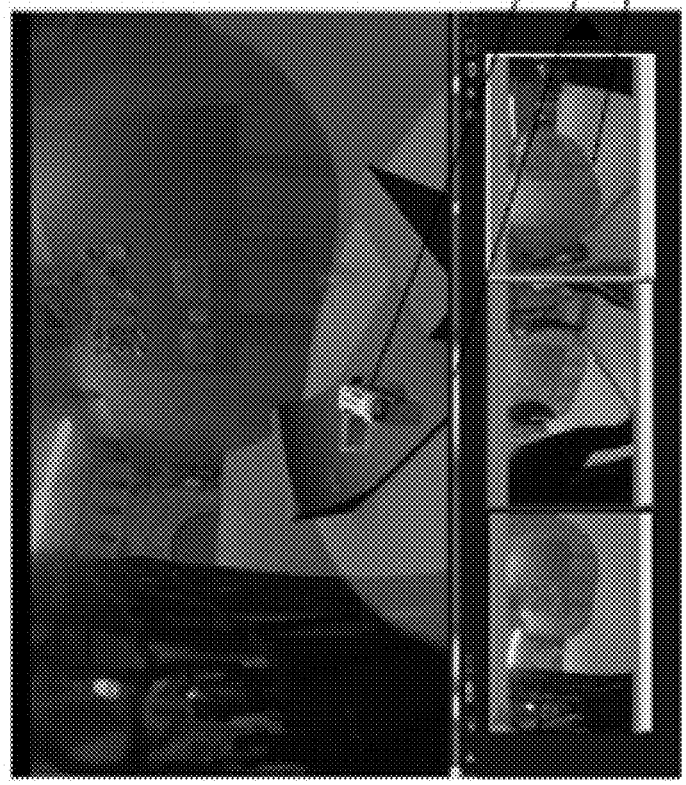

FIGS. 6A and 6B are diagrams illustrating examples of two possible presentations of the interactive multi-view video playback interface, according to some implementations of the present disclosure. The 3D interactive view in FIG. 6A shows a 3D template model corresponding to the event with icons/widgets at the reconstructed video poses. These icons also illustrate the currently playing camera and which viewpoints are available (or in range) at the current playback time. Users can spatially browse the video scene by clicking on a desired camera viewpoint on the map.

As not all of the videos start or end at the same time, a video density bar can be displayed alongside the normal seek bar to illustrate how many videos are available at a given time (see FIG. 6B). Alternatively, a hot-watch highlight bar can be used to indicate the highlights of the event. Such a highlight bar is similar to what could be used for single video playback. This highlight bar can either be curated manually, or it can use cues from social media, or accept feedback from logged user interaction. In the case of multi-view, a useful cue is both the number and quality of videos available at any given moment. Additionally, the number of times users have replayed a moment in time from different viewpoints can also be used as a cue to drive the density of the highlight bar.

To ensure a good interactive experience, the interface may present seamless transitions between viewpoints when requested by a user. Abrupt discontinuities in playback due to rebuffering upon switch requests are minimized.

Instantaneous switching between video viewpoints or seeking in time utilizes immediate random access to all of the video data. Guaranteeing such random access would require prebuffering or downloading all of the videos before playback, possibly leading to a poor user experience. Relaxing the constraint on instantaneous seeking, streaming all of the videos simultaneously would allow instantaneous viewpoint switching, but due to bandwidth constraints such streaming will likely not be possible. Instead of these extremes, an ideal player only downloads the video portions that will be watched, but must trade-off prebuffering some regions of the video in order to ensure interactive switching.

One solution to the trade-off between bandwidth and interactivity is to use a form of back buffering. The currently selected main video is played in the foreground, and to try to ensure fast interactive switching, a second back-buffer video will be streamed, buffered, and played in the background. The streaming of the video in the back-buffer can monitor the user behavior, such as hover over a virtual viewpoint to predict which video will be selected. Alternatively, the history of all users can be used as a prior to determine which will be the most likely next viewpoint, or some pre-buffering of all videos around key time points can be performed.

Figure 7:
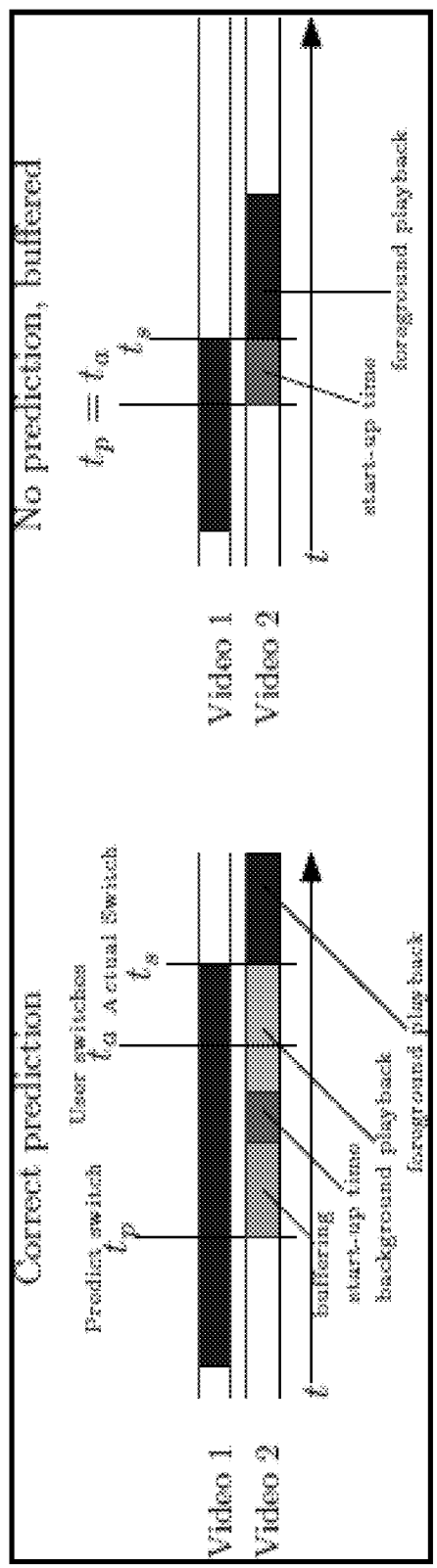
FIG. 7 is a diagram illustrating a prediction and buffering timeline, according to some implementations.

After the video to be back-buffered has been identified, the video can be buffered and played in the background. FIG. 7 illustrates a timeline for such an event, where tp indicates the time where the prediction was made, $t_a$ indicates the time where a user actually selected the viewpoint, and $t_s$ is the time where the system has completed switching in the new video. At the moment of $t_p$, the back-buffering video player must fetch enough video data to start playback (buffering time). There is also a slight delay after the data is completely available to start-up the player. If the user selection time, $t_a$, occurs after start-up has completed, the back-buffered video can simply be swapped into the foreground.

FIG. 7 illustrates two examples of a prediction & buffering timeline. At time tp, the system predicts a user will shortly switch to video 2, so video 2 is buffered and starts to playback in the background. The user then actually requests the switch at time ta after which we use a delay animation of length ts−ta to allow for buffering/playback to be ready. When the prediction is correct (left), this delay animation can be short. If the video is buffered (right), the delay need only be long enough to cover the playback start-up time.

However, to ensure a consistent experience when the video prediction is incorrect or the video data is not completed buffering, the system use an animation delay ts−ta>start-up time. This animation delay should at least cover the time until the back-buffered video is ready for playback. In this way, the user is still able to watch the current primary video until the secondary, back-buffered view is available. Further, in the case the back-buffer video is already playing in the background, the animation delay allows a final synchronization of the playback time before the back-buffered video is swapped into the foreground.

The above strategy can be implemented using current video streaming technology. New standards in streaming video, such as MPEG-DASH, also allow for seamless on-the-fly quality changes, if bandwidth is available. Using MPEG-DASH, the above buffering scheme could use low-quality video in the back-buffer, ensuring lower-bandwidth and therefore faster buffering times of the back-buffer. After the video is brought into the foreground, the quality could then automatically be improved according to available bandwidth. Similarly, scalable video coding (SVC) methods could be used to derive a utility-based policy for transmitting the data from background views if bandwidth is available. For example, a policy may be defined to try and prefer to have some low-quality video from all of the viewpoints available, allowing for both fast switching and reuse of the image data for display on thumbnails in the 3D map view.

Transition Animations

The buffering strategy described above relies on a slight delay after the user chooses a new video to cover latencies in preparing the background video for playback. To give the appearance of a more responsive playback transition, an animation or effect can be overlayed on the video during this transition time.

One such effect would be to animate a pan, scan, and fade of the thumbnail of a video selection from where the element of user interaction to the currently main video. If available, the 3D information recovered from the computer vision component of the system can be used to animate a free-viewpoint switch. Such a transition also gives the user a better feeling of the space of the environment, as the rendering looks like a 3D flythrough of the scene. Such a transition can be rendered using only a coarse approximating scene geometry, and projective texture mapping the currently playing video texture onto the scene. In one implementation, this may be referred to as free-viewpoint rendering. A single input image and a coarse scene geometry can be used to synthesize views over nearby regions. The top-down view shows the texture being projected onto the scene.

Additional transition effects can also include slow motion or a replay mode, where the time is re-winded upon video switch so that the user may view the same event from different viewpoints. The rewind time point can use information from the video density bar to automatically identify a dynamic rewind point.

The description above presents a complete system and method for achieving multi-view video playback from user generated content. The system focuses on extracting, utilizing, and presenting all available information, including video start time and 3D camera locations. In doing so, the system achieves an intuitive multi-view browsing experience, where the user is visually guided to interesting points in time and space by considering the available video quality cues, 3D pose information, and history of user-interaction. These same cues are also exploited in a predictive back-buffering strategy during playback, which ensures interactivity while reducing bandwidth constraints in Internet Protocol transmission.

Figure 8:
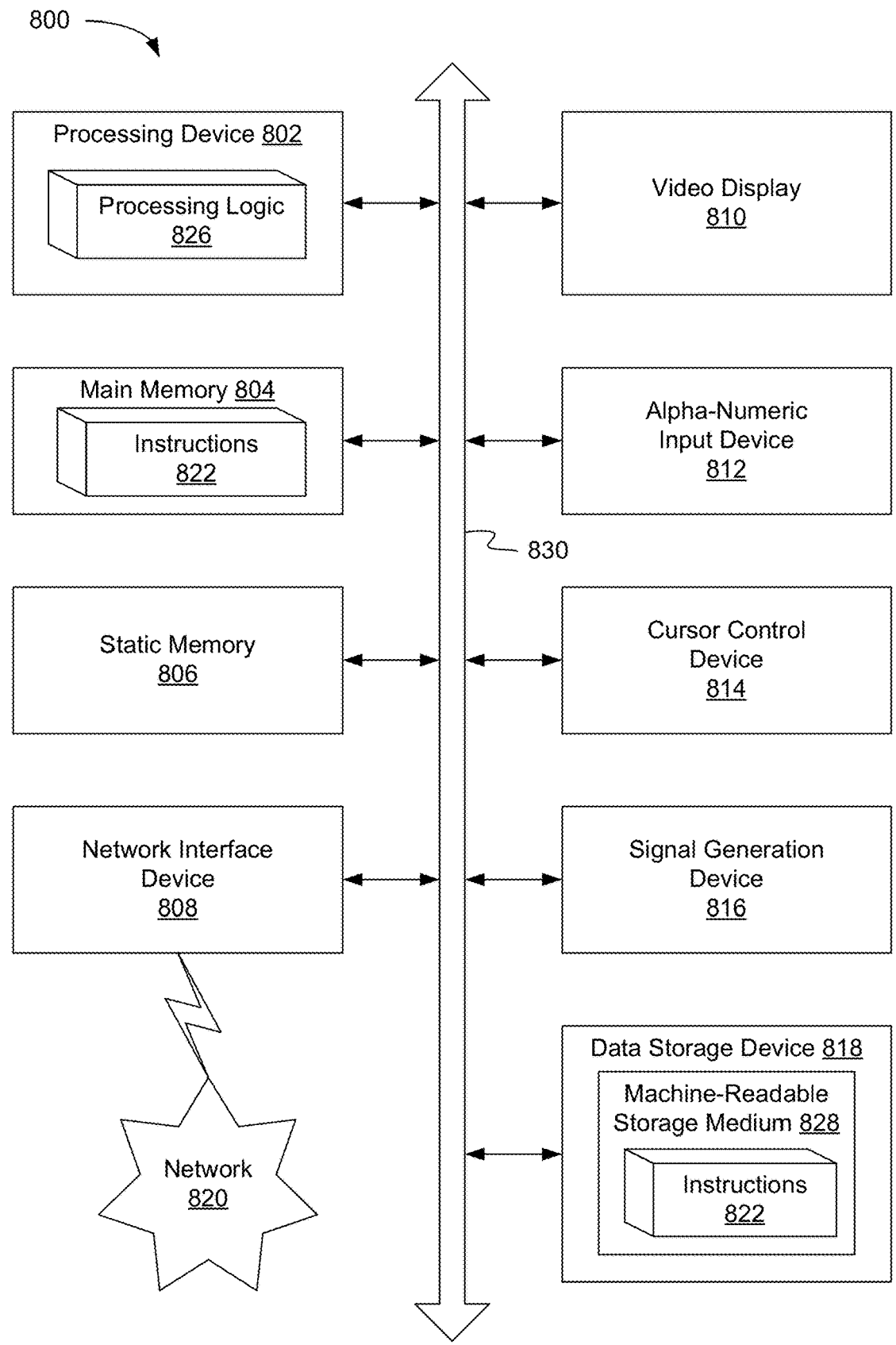
FIG. 8 is a block diagram illustrating an exemplary computer system, according to some implementations.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828, on which is stored one or more set of instructions 822 (e.g., software) embodying any one or more of the methodologies of functions described herein. The instructions 822 may also reside, completely or at least partially, within the main memory 804 and/or within the processing device 802 during execution thereof by the computer system 800; the main memory 804 and the processing device 802 also constituting machine-readable storage media. The instructions 822 may further be transmitted or received over a network 820 via the network interface device 808.

The machine-readable storage medium 828 may also be used to store instructions to perform a method for multi-view audio and video interactive playback, as described herein. While the machine-readable storage medium 828 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying, by a processing device, a plurality of media items associated with a real-world event, wherein each of the plurality of media items is created by capturing the real-world event from a particular geographic position and comprises a video portion and an audio portion;

synchronizing the audio portions of each of the plurality of media items according to a common reference timeline;

determining a relative geographic position associated with each of the plurality of media items; and providing the plurality of media items for presentation in an interactive multi-view player interface based at least on the synchronized audio portions and multiple relative geographic positions, wherein the interactive multi-view player interface allows a user of a plurality of users to switch between different viewpoints in space across the plurality of media items, and to seek, on a plurality of event bars, to different points in time across the plurality of media items and beyond a single media item of the plurality of media items associated with the multiple relative geographic positions, wherein the plurality of event bars comprises a video density bar indicating a number of media items available at a given point in time across the plurality of media items and an event highlight bar indicating a popularity of content portions of respective media items at the given point in time across the plurality of media items, and wherein the popularity of the content portions of the respective media items at the given point in time is determined using one or more factors comprising a number of times the respective media items were replayed at the given point in time from different viewpoints by the plurality of users.

2. The method of claim 1, further comprising:
generating a single edited media item associated with the real-world event, by combining the plurality of media items based on the synchronized audio portions.

3. The method of claim 1, wherein identifying the plurality of media items comprises determining media items having metadata that identifies the real-world event.

4. The method of claim 1, wherein synchronizing the audio portions of each of the plurality of media items comprises determining a temporal offset for each of the plurality of media items that increases a correlation for a frequency-based audio spectrogram of each audio portion, wherein the temporal offsets represent locations on the common reference timeline.

5. The method of claim 1, wherein determining the relative geographic position associated with each of the plurality of media items comprises determining relative positions of separate cameras used to capture each of the plurality of media items at a time of the real-world event based on a plurality of points visible in each of the plurality of media items.

6. The method of claim 1, wherein providing the plurality of media items for presentation in the interactive multi-view player interface comprises:
displaying an icon representing each of the plurality of media items, wherein each icon is displayed in a location based on the corresponding relative geographic position;
receiving a user selection of an icon representing a first media item of the plurality of media items and beginning playback of the first media item; and
receiving, at a time during playback of the first media item corresponding to a first point on the common reference timeline, a user selection of an icon representing a second media item of the plurality of media items and beginning playback of the second media item at a time in the second media item corresponding to the first point on the common reference timeline.

7. The method of claim 6, further comprising:
predicting a subsequent media item to be selected by the user; and
buffering the subsequent media item prior to a user selection of the subsequent media item.

8. A non-transitory machine-readable storage medium storing instructions which, when executed, cause a processing device to perform operations comprising:
identifying, by the processing device, a plurality of media items associated with a real-world event, wherein each of the plurality of media items is created by capturing the real-world event from a particular geographic position and comprises a video portion and an audio portion;
synchronizing the audio portions of each of the plurality of media items according to a common reference timeline;
determining a relative geographic position associated with each of the plurality of media items; and
providing the plurality of media items for presentation in an interactive multi-view player interface based at least on the synchronized audio portions and multiple relative geographic positions,
wherein the interactive multi-view player interface allows a user of a plurality of users to switch between different viewpoints in space across the plurality of media items, and to seek, on a plurality of event bars, to different points in time across the plurality of media items and beyond a single media item of the plurality of media items associated with the multiple relative geographic positions,
wherein the plurality of event bars comprises a video density bar indicating a number of media items available at a given point in time across the plurality of media items and an event highlight bar indicating a popularity of content portions of respective media items at the given point in time across the plurality of media items, and
wherein the popularity of the content portions of the respective media items at the given point in time is determined using one or more factors comprising a number of times the respective media items were replayed at the given point in time from different viewpoints by the plurality of users.

9. The non-transitory machine-readable storage medium of claim 8, wherein the operations further comprise:
generating a single edited media item associated with the real-world event, by combining the plurality of media items based on the synchronized audio portions.

10. The non-transitory machine-readable storage medium of claim 8, wherein identifying the plurality of media items comprises determining media items having metadata that identifies the real-world event.

11. The non-transitory machine-readable storage medium of claim 8, wherein synchronizing the audio portions of each of the plurality of media items comprises determining a temporal offset for each of the plurality of media items that increases a correlation for a frequency-based audio spectrogram of each audio portion, wherein the temporal offsets represent locations on the common reference timeline.

12. The non-transitory machine-readable storage medium of claim 8, wherein determining the relative geographic position associated with each of the plurality of media items comprises determining relative positions of separate cameras used to capture each of the plurality of media items at a time of the real-world event based on a plurality of points visible in each of the plurality of media items.

13. The non-transitory machine-readable storage medium of claim 8, wherein providing the plurality of media items for presentation in the interactive multi-view player interface comprises:
   displaying an icon representing each of the plurality of media items, wherein each icon is displayed in a location based on the corresponding relative geographic position;
   receiving a user selection of an icon representing a first media item of the plurality of media items and beginning playback of the first media item; and
   receiving, at a time during playback of the first media item corresponding to a first point on the common reference timeline, a user selection of an icon representing a second media item of the plurality of media items and beginning playback of the second media item at a time in the second media item corresponding to the first point on the common reference timeline.

14. The non-transitory machine-readable storage medium of claim 13, wherein the operations further comprise:
   predicting a subsequent media item to be selected by the user; and
   buffering the subsequent media item prior to a user selection of the subsequent media item.

15. A server computer system comprising:
   a processing device;
   a memory coupled to the processing device; and
   an interactive multi-view module, executable by the processing device from the memory, to:
      identify a plurality of media items associated with a real-world event, wherein each of the plurality of media items is created by capturing the real-world event from a particular geographic position and comprises a video portion and an audio portion;
      synchronize the audio portions of each of the plurality of media items according to a common reference timeline;
      determine a relative geographic position associated with each of the plurality of media items; and
      provide the plurality of media items for presentation in an interactive multi-view player interface based at least on the synchronized audio portions and multiple relative geographic positions,
         wherein the interactive multi-view player interface allows a user of a plurality of users to switch between different viewpoints in space across the plurality of media items, and to seek, on a plurality of event bars, to different points in time across the plurality of media items and beyond a single media item of the plurality of media items associated with the multiple relative geographic positions,
         wherein the plurality of event bars comprises a video density bar indicating a number of media items available at a given point in time across the plurality of media items and an event highlight bar indicating a popularity of content portions of respective media items at the given point in time across the plurality of media items, and
         wherein the popularity of the content portions of the respective media items at the given point in time is determined using one or more factors comprising a number of times the respective media items were replayed at the given point in time from different viewpoints by the plurality of users.

16. The server computer system of claim 15, wherein the interactive multi-view module further to:
   generate a single edited media item associated with the real-world event, by combining the plurality of media items based on the synchronized audio portions.

17. The server computer system of claim 15, wherein to identify the plurality of media items, the interactive multi-view module to determine media items having metadata that identifies the real-world event.

18. The server computer system of claim 15, wherein to synchronize the audio portions of each of the plurality of media items, the interactive multi-view module to determine a temporal offset for each of the plurality of media items that increases a correlation for a frequency-based audio spectrogram of each audio portion, wherein the temporal offsets represent locations on the common reference timeline.

19. The server computer system of claim 15, wherein to determine the relative geographic position associated with each of the plurality of media items, the interactive multi-view module to determine relative positions of separate cameras used to capture each of the plurality of media items at a time of the real-world event based on a plurality of points visible in each of the plurality of media items.

20. The server computer system of claim 15, wherein to provide the plurality of media items for presentation in the interactive multi-view player interface, the interactive multi-view module to:
   display an icon representing each of the plurality of media items, wherein each icon is displayed in a location based on the corresponding relative geographic position;
   receive a user selection of an icon representing a first media item of the plurality of media items and begin playback of the first media item; and
   receive, at a time during playback of the first media item corresponding to a first point on the common reference timeline, a user selection of an icon representing a second media item of the plurality of media items and begin playback of the second media item at a time in the second media item corresponding to the first point on the common reference timeline.

* * * * *